EFH IS A VERTICAL PLANE
EJH IS A HORIZONTAL PLANE

OC IS THE ARRIVING WAVE
OAC IS A VERTICAL PLANE
OAE IS A HORIZONTAL PLANE
∡B IS IN VERTICAL PLANE OAC
∡D IS IN HORIZONTAL PLANE OAE

INVENTOR.
JOHN M. FAIRALL
BY
William D. Hall
Attorney

Patented Nov. 29, 1949

2,489,276

UNITED STATES PATENT OFFICE 2,489,276

RADIO DIRECTION FINDER

John M. Fairall, Des Moines, Iowa

Application February 19, 1946, Serial No. 648,806

4 Claims. (Cl. 343—115)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to apparatus for measuring the vertical angle of incidence of high-frequency wave energy arriving at a receiving point.

Communication between distant points by means of high-frequency electro-magnetic waves propagated in space depends principally upon ionospheric wave refraction. The vertical angle which the incoming wave makes at a receiving point with a tangent to the earth is designated as the angle of incidence. High-frequency signals arriving from distant transmitters are usually a complex combination of two or more skywaves travelling along different paths in reaching the receiver, and arriving at different angles of incidence.

Exact knowledge of the angle of incidence is useful in the design and installation of certain fixed receiving antenna systems, such as rhombic antennas, and in various other applications. While devices are known in the art, adapted to measure the vertical angle of incidence of an arriving wave, these devices suffer from various inherent deficiencies. One such device, which is more fully described in "Wireless Direction-Finding" by R. Keen (page 124, third edition), entails two spaced loops which are rotatable as a unit, the loops being spaced one-twelfth of a wave length apart. This spacing requirement serves as a limitation in the working frequency range of the device. Another method involved spaced vertical antennas, a fraction of a wave length apart, operating in conjunction with an injection-oscillator antenna disposed in front of said spaced antennas. This arrangement is further limited with regard to wave direction as well as to frequency range.

Still another technique which has been devised for investigating the character of an incident wave is the pulse method. Since each received pulse from a distant transmitter corresponds to a particular path, each path can be separately studied. This system is disadvantageous inasmuch as the vector sum, rather than the individual paths of the complex incident waves, is of more interest in designing receiving antennas which are to be employed over broad ranges of frequencies. Moreover, the pulse method presupposes the cooperation of a transmitting station which is not always feasible.

It is possible, also, to calculate the angle of incidence of an arriving wave; but results are of questionable validity by reason of the fact that the angle of incidence is a function of many variable factors, such as the frequency of an incoming signal, the condition of the ionized layers, the distance of transmission, and the number of times the signal is reflected from the ionosphere.

It may be concluded from the foregoing that the need exists for practical apparatus adapted to measure the vertical angle of incidence of an arriving wave for a wide range of frequencies in any direction and with any type of signal. Such apparatus has extensive application. For example, in setting-up a world-wide receiving station, measurement of the angle of incidence of signals arriving at the proposed site would be useful in designing suitable antennas to operate at optimum efficiency. Where a rhombic antenna is employed, by knowing the angle of incidence, the tilt angle thereof may be adjusted to secure maximum gain. The proposed apparatus also will enable the determination of range, as well as azimuth, by means of a single direction-finding radio installation. Range between a transmitting and receiving point is determinable by measurement of the angle of incidence and knowledge of the ionospheric height obtained by other means.

By measuring the angle of incidence of a signal transmitted from a station of known location the height of the ionosphere may be calculated. This will permit instantaneous determination of the height of the ionosphere at points not immediately above stations equipped for measuring the height of the ionosphere.

The determination of vertical angle of incidence as well as the determination of azimuth bearing will permit considerable improvement in the accuracy of visual-indicator, direction-finders operating on multiple path skywave signals. The simultaneous presentation of incidence data with the bearing pattern appearing on a visual indicator will greatly enhance the operator's ability to choose the instant of most favorable propagation, hence the most probable bearing azimuth.

Accordingly, it is the primary object of the present invention to obviate the drawbacks of prior art apparatus heretofore known, and to provide new and improved apparatus capable of accurately measuring the angle of incidence of an arriving wave for a wide range of frequencies, for any direction in azimuth and with any type of signal.

Another object of the invention is to provide apparatus of the above type which is simple to operate and inexpensive to construct.

In general terms, the principle underlying the operation of the invention is based on the phasal relationship existing between the signals induced in a pair of vertical antennas having a fixed spacing, each antenna intercepting an arriving wave front at a different point in time. It can be shown that for a specific spacing between antennas and with a specific frequency of arriving wave, the phase shift between currents induced in the respective antennas is a function both of the vertical angle of incidence of the arriving wave and the horizontal angular displacement between the directional plane of the arriving wave and the plane containing the pair of vertical antennas. This functional relationship is utilized in the invention to ascertain the vertical angle of incidence by providing means for determining the azimuth of the directional plane of an arriving wave, and means for evaluating in terms of transmission line length the phase shift existing between currents in the antenna pair at a known horizontal angle between the directional plane of the arriving wave and the plane of the antenna pair. Thus by giving the phase shift a certain value and knowing the horizontal angle, the vertical angle of incidence may be readily computed.

For a better understanding of the invention as well as other objects and further features thereof, reference is had to the following detailed description to be read in connection with the accompanying drawings, wherein like components are designated by like numerals.

Figure 1:
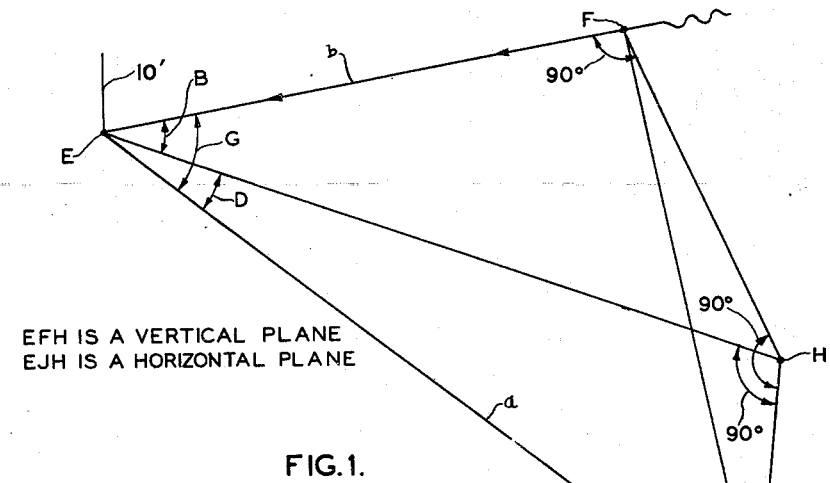
Figure 1 is a trigonometric diagram illustrating the theory of the invention.

Referring now to the drawings and more particularly to Fig. 1, there is shown, in order to explain the theory underlying the invention, two spaced vertical receiving antennas 10 and 10' disposed at points E and J, respectively. The line $a$ drawn between points E and J represents the distance between antennas 10 and 10'.

It will be assumed that wave energy is travelling along a line extending between a point F in space and point E, the arrowheads indicating the direction of travel. The directional plane of the wave having points F, E and H therein is displaced from the plane containing vertical antennas 10 and 10' and having points E and J therein by a horizontal angle D. Points E, H and J lie in a horizontal plane. The wave is travelling at a vertical angle of incidence B.

The wave front of arriving energy has points F, H and J therein at the instant shown when it is passing antenna 10. The arriving wave must traverse the distance between the points E and F before reaching 10', this distance being represented by symbol $b$. It will be seen that, $$b = a \cos G$$

where: angle G is the angular displacement between lines $a$ and $b$.

The signal induced in 10' is displaced in phase with that induced in antenna 10 by the time required to traverse distance $b$. Thus, $$t = \frac{a \cos G}{v}$$

where:

$v$ is the free space velocity of the wave, and
$t$ is the phase difference expressed in time.

The angle travelled or phase angle is $\phi$, $$\phi = 2\pi f t$$

hence, $$t = \frac{\phi}{2\pi f}$$

where: $f$ is the frequency of the arriving wave.

Setting equals to equals, $$\frac{\phi}{2\pi f} = \frac{a \cos G}{v}$$

hence, $$\phi = \frac{2\pi f a \cos G}{v}$$

Now by spherical trigonometry, it can be shown that, $$\cos G = \cos D \cos B$$

hence, $$\phi = \frac{2\pi f a \cos D \cos B}{v} \qquad (1)$$

For a given signal, frequency $f$ is a constant. For a given pair of antennas 10 and 10', distance $a$ therebetween is a constant, and the velocity of wave travel $v$ is a constant. Therefore, from Equation 1 it will be evident that if the phase angle $\phi$ can be adjusted to equal a certain value, then cos B becomes a function of cos D.

In order to adjust phase angle $\phi$ to equal a certain value, it is now intended to evaluate the phase angle $\phi$ in terms of a transmission line length. It is recognized that a non-resonant transmission line will behave as a phase shifter, the angle of phase shift being identified herein by symbol $\mu$, $$\mu = \frac{2\pi f l k}{v}$$

where:

$l$ is the length of the transmission line,
$k$ is a constant depending upon the characteristic of the line, and
$v$ is the free space velocity of radio waves.

It has been shown that the signal induced in antenna 10' is shifted $\phi$ radians with respect to the signal in antenna 10 when the wave traverses the distance $a$ therebetween. If the signal from antenna 10 is passed through a transmission line which is $l$ feet longer than the transmission line from antenna 10', it will be shifted $\mu$ radians with respect to itself. Then, by inverting the signal from antenna 10, 180° after passing through the longer transmission line and feeding both the signals from antennas 10 and 10' to a common load, the two signals will cancel each other or null out when phase angle $\phi$ is equal to phase angle $\mu$. The phase angle $\phi$ may be varied by adjusting horizontal angle D, the angle between the plane of wave direction and the plane containing vertical antennas 10 and 10'. When angle $\phi$ is equal to angle $\mu$, the following relationships exist:

$$\frac{2\pi f l k}{v} = \frac{2\pi f a \cos D \cos B}{v}$$

$$l k = a \cos D \cos B$$

hence, $$\cos B = \frac{l k \sec D}{a} \qquad (2)$$

Thus from Equation 2 it is seen that angle $\phi$ has been given a certain value in terms of a transmission line length, and cos B is a function of cos D.

Figure 2:
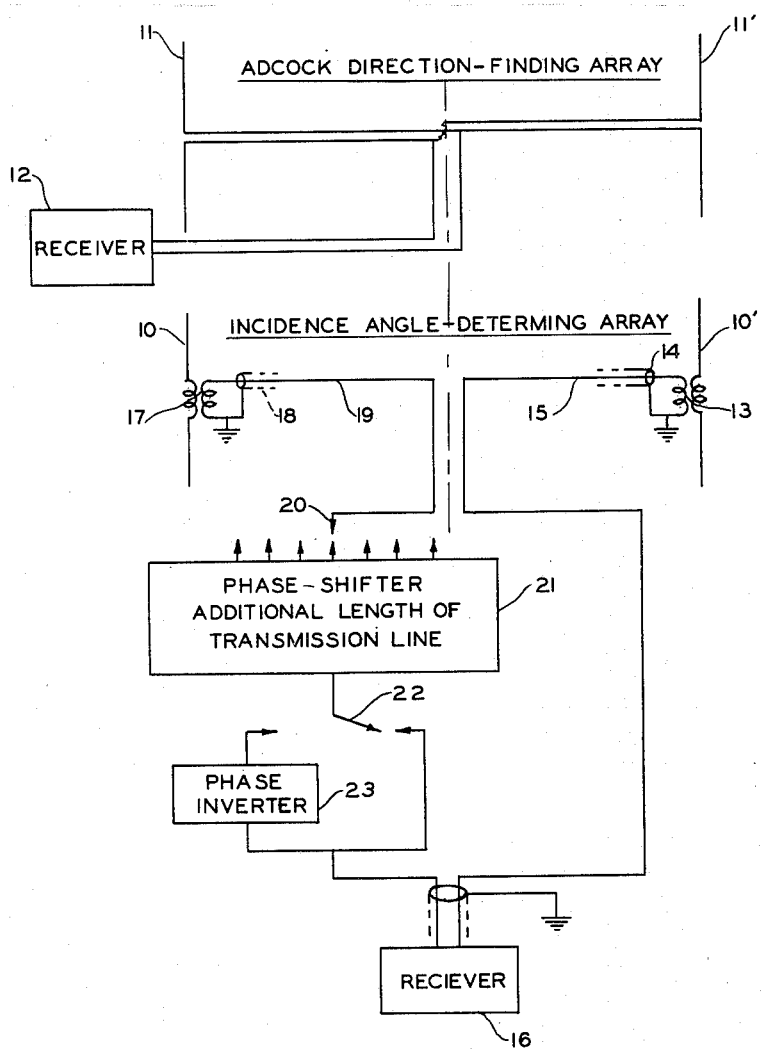
Figure 2 is a block diagram of a preferred embodiment in accordance with the invention.

Referring now to Fig. 2, a preferred embodiment of the invention, operating in accordance with the foregoing theory, is shown comprising a direction-finding system including an Adcock array having spaced vertical dipole-antennas 11 and 11' rotatable as a unit, and an incidence angle-determining system including an array having a pair of spaced vertical dipole-antennas 10 and 10', similarly rotatable as a unit.

As is usual in Adcock design, to prevent horizontally polarized waves from affecting the direction-finder, the upper leg of dipole 11 is connected to the lower leg of dipole 11', while the lower leg of dipole 11 is connected to the upper leg of dipole 11'. The output of the Adcock array is fed to a conventional direction-finding receiver 12. In the incidence angle-determining array, dipole 10' is coupled by a suitable impedance-matching transformer 13 to a concentric line whose outer conductor 14 is grounded, and whose inner conductor 15 is connected to the input circuit of a receiver 16, of conventional construction. Receiver 16 may be identical in design with receiver 12. The output of dipole-antenna 10 is coupled by means of an impedance-matching transformer 17 to a concentric line whose outer conductor 18 is grounded, and whose inner conductor 19 is connected to the selector 20 of a variable phase shifter 21, the phase shifter preferably taking the form of additional lengths of transmission line. Each length of transmission line is different so as to provide a distinct phase shift, whereby phase angle $\mu$ may be selected in a stepwise manner.

The output of phase shifter 21 is connected by means of a single pole, double-throw switch 22, either directly to the input circuit of receiver 16, or through a phase inverter 23, of any suitable design, providing a 180° phase shift.

Figure 3:
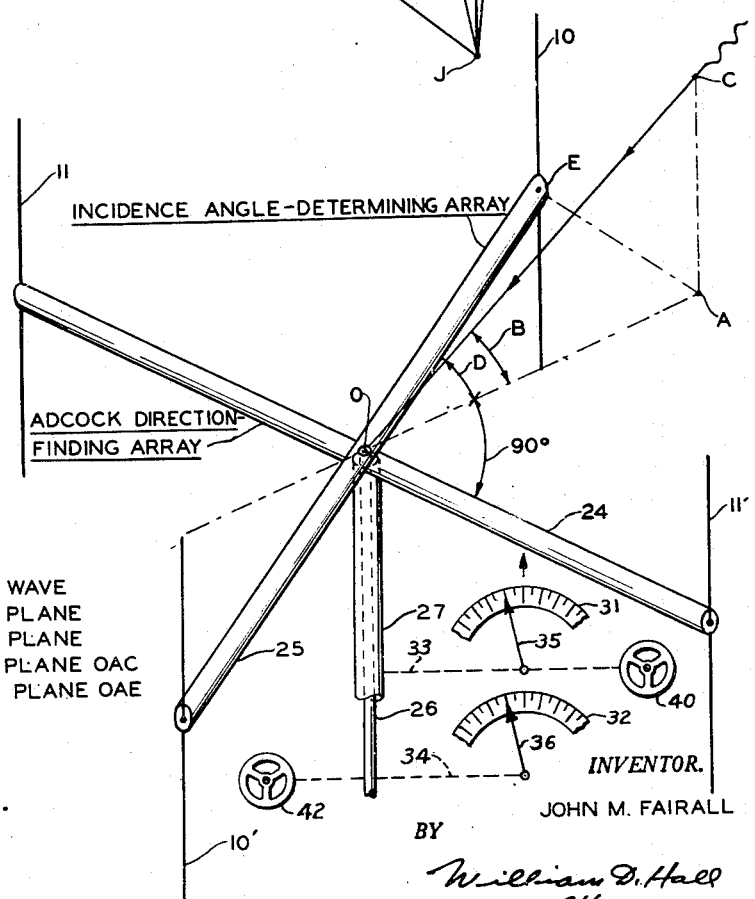
Figure 3 is a perspective drawing of the antenna units incorporated in said preferred embodiment.

The physical arrangement of the direction-finding array and the incidence angle-determining array is shown in perspective in Fig. 3. It will be seen that Adcock dipoles 11 and 11' are mounted at opposite ends of a rotatable horizontal arm 24, while spaced dipoles 10 and 10' are mounted at opposite ends of an independently rotatable horizontal arm 25. Arm 25 is disposed directly above arm 24, both arms being rotatable about their midpoint at a common vertical axis running through point O. In order to support and rotate arms 24 and 25, concentric vertical shafts 26 and 27 may be provided, the upper end of outer shaft 27 being affixed to arm 24, and the upper end of the inner shaft 26 being affixed to arm 25. Shaft 27 may be rotated by means of handwheel 40 attached thereto, and shaft 26 may be rotated by means of handwheel 42 attached thereto. The lower end of the shaft 27 is connected, as indicated by broken line 33, to the pointer 35, which indicates on the scale 31 the angular adjustment of the shaft 27. In a like manner, the pointer 36 and scale 32 coact to indicate the instant angular adjustment of the shaft 26 as indicated by broken line 34.

The behavior of the apparatus will now be considered. Let it be assumed in Fig. 3 that an incoming wave is travelling along the line extending between a point C in space and point O. In accordance with the directional properties of an Adcock array, when the array is adjusted so that a null indication is obtained in receiver 12, the vertical plane of the Adcock array is perpendicular to the vertical plane of direction of the incoming wave. The angle of incidence of the incoming wave is the angle B in the vertical directional plane containing points AOE.

Antenna 10 is the first to intercept the incoming wave, being closest to the source of radiation, and the signal induced in antenna 10 passes through a transmission line in phase shifter 21 which is $l$ feet longer than the transmission line from antenna 10'. Obviously, by inserting different lengths of line, the phase angle $\mu$ may be varied.

After passing through the additional transmission line of $l$ feet, the signal from antenna 10 is inverted in phase by inverter 23 and then applied to a common input circuit in receiver 16. As a result, appearing in the input circuit of receiver 16 are the combined signals from antennas 10 and 10', the signal from antenna 10 having been shifted in phase $\mu+180°$ with respect to itself, and the signal from antenna 10' being displaced at a phase angle $\phi$ with respect to the signal from antenna 10.

By selecting a particular length of transmission line in phase shifter 21, the phase angle $\mu$ is set at a certain value for a given frequency of arriving wave. When the plane of antennas 10 and 10' and the plane of direction of the arriving wave are co-planar (that is, angle D is equal to 0°), the wave in travelling from antenna 10 to antenna 10' lags in phase by an angle $\phi$ which, as will be apparent from Equation 1, is equal to $(2\pi fa \cos B)/v$.

Now by rotating the incidence angle-determining array with respect to the Adcock array, the horizontal angle D can be varied until the combined signals in the input circuit of receiver 16 null out. When this condition occurs, phase angle $\phi$ is equal to phase angle $\mu$. The angle (90°−D) is then measured between the plane of the Adcock array and the plane of the dipoles. This is accomplished by comparing the readings obtained on the dials 31 and 32 showing the relative angular positions of the Adcock array and the incidence angle-determining array.

It has been shown by Equation 2 that when phase angle $\phi$ is equal to phase angle $\mu$, $$\cos B = \frac{lk \sec D}{a}$$

let $lk=L$ $$\cos B = \frac{L \sec D}{a} \qquad (3)$$

From Equation 3 it will be seen that the invention, as disclosed in Figs. 2 and 3, may be employed to derive the vertical angle of incidence B of an arriving wave, since the apparatus enables the determination of D and L, $a$ being fixed.

To facilitate operation of the apparatus, it may be desirable to set up a table of values of the angle of incidence B for given values of L and horizontal angle D. Any value of L can be used to give useful values of cos B and sec D. For example, if the distance $a$ between antennas 10 and 10' is twenty-three feet and nine inches, $$\cos B = \frac{L \sec D}{23.75} \qquad (4)$$

The following is a table based on Equation 4 of values of B for given values of L and D:

Values of B

| L | 23.7 | 23.5 | 23.2 | 22.5 | 21.5 | 20.0 | 18.0 |
|---|---|---|---|---|---|---|---|
| D | | | | | | | |
| 0° | 3° 43′ | 8° 19′ | 12° 21′ | 18° 40′ | 25° 9′ | 32° 38′ | 40° 43′ |
| 1 | 3 35 | 8 16 | 12 19 | 18 39 | 25 26 | 32 37 | 40 42 |
| 2 | 3 8 | 8 5 | 12 12 | 18 34 | 25 23 | 32 35 | 40 41 |
| 3 | 2 12 | 7 45 | 11 59 | 18 26 | 25 17 | 32 31 | 40 38 |
| 4 | | 7 18 | 11 42 | 18 15 | 25 9 | 32 25 | 40 33 |
| 5 | | 6 39 | 11 19 | 18 1 | 24 59 | 32 17 | 40 28 |
| 6 | | 5 47 | 10 49 | 17 43 | 24 47 | 32 8 | 40 21 |
| 7 | | 4 30 | 10 12 | 17 21 | 24 32 | 31 57 | 40 13 |
| 8 | | 2 18 | 9 27 | 16 56 | 24 14 | 31 45 | 40 4 |
| 9 | | | 8 30 | 16 26 | 23 54 | 31 30 | 39 53 |
| 10 | | | 7 17 | 15 51 | 23 11 | 31 13 | 39 41 |
| 11 | | | | 15 11 | 22 45 | 30 56 | 39 28 |
| 12 | | | | 14 24 | 22 36 | 30 35 | 39 13 |
| 13 | | | | 13 31 | 22 4 | 30 12 | 38 56 |
| 14 | | | | 12 39 | 21 6 | 29 47 | 38 38 |
| 15 | | | | 11 15 | 20 25 | 29 20 | 38 19 |
| 16 | | | | | 19 39 | 28 50 | 37 58 |
| 17 | | | | | 18 48 | 28 17 | 37 35 |
| 18 | | | | | 17 51 | 27 42 | 37 10 |
| 19 | | | | | 16 47 | 27 3 | 36 43 |
| 20 | | | | | 15 34 | 26 19 | 36 14 |
| 21 | | | | | 14 9 | 25 34 | 35 44 |
| 22 | | | | | | 24 44 | 35 10 |
| 23 | | | | | | 23 49 | 34 35 |
| 24 | | | | | | 22 48 | 33 57 |
| 25 | | | | | | 21 42 | 33 15 |
| 26 | | | | | | 20 27 | 32 31 |
| 27 | | | | | | | 31 43 |
| 28 | | | | | | | 30 52 |
| 29 | | | | | | | 29 57 |
| 30 | | | | | | | 28 56 |
| 31 | | | | | | | 27 51 |
| 32 | | | | | | | 26 40 |
| 33 | | | | | | | 25 21 |

The values of L given in the table have been selected so that $a-1°$ variation of D measures a 1° variation of B, approximately. Values of B below the solid lines are not usable because they do not satisfy this standard. The values of B above the dash lines vary by less than 1° for a variation of 1° in D, and are useful for more exact measurements. This table is suitable for measuring values of B from 3.5° to 40.5° as accurately as D can be read. This accuracy would be on the order of 0.5°.

In practice it is desirable to calibrate the apparatus with a signal source of known altitude. It is to be noted that switch 22 may be employed to by-pass inverter 23, whereby maximum signal in lieu of minimum signal may be obtained from antennas 10 and 10′ in receiver 16. It is to be understood that although the invention has been described as employing an Adcock array to determine the plane of wave direction, it is not limited to Adcocks, other direction-finding antennas being usable. The invention is operable with a wave, modulated or unmodulated, arriving from any direction in azimuth.

While there has been shown what is at present considered a preferred embodiment of the invention, it will be obvious that many changes and modifications may be made therein without departing from the invention. For example, while phase shifter 21 has been described as comprising a plurality of different lengths of transmission line to provide stepwise changes in phase angle $\mu$, a transmission line designed to be continuously variable may be employed with equal success. Accordingly, it is aimed in the annexed claims to cover all such changes and modifications as fall within the true spirit and scope of the invention.

What is claimed is:

1. Apparatus for measuring the vertical angle of incidence of an arriving wave comprising a pair of vertical receiving antennas having a fixed spacing therebetween, a radio receiver having an input circuit, means for directly applying the output signal from one of said antennas to said receiver input circuit, a nonresonant transmission line phase-shifter, means for applying the output signal from the other of said antennas through said phase-shifter to the input circuit of said receiver, means for orienting the plane of said antennas with respect to the plane of direction of the arriving wave whereby the signals from said antennas are in phase coincidence in said receiver circuit, and means for indicating the resultant horizontal angular displacement between the plane of said antennas and the plane of direction of the arriving wave, whereby the vertical angle of incidence of the arriving wave may be determined from the formula $$\cos B = \frac{L \sec D}{a}$$

where,

L is a constant dependent upon the length and characteristics of said transmission line phase shifter, $a$ is a fixed spacing between said antennas, D is the horizontal angular displacement between the plane of said antennas and the plane of direction of said arriving wave, and B is the vertical angle of incidence of said arriving wave.

2. Apparatus for measuring the vertical angle of incidence of an arriving wave comprising a pair of vertical receiving antennas having a fixed spacing therebetween, a radio receiver having an input circuit, means for applying the output signal from one of said antennas directly to said receiver input circuit, a nonresonant transmission line phase-shifter, a phase inverter, means for applying the output signal from the other of said antennas through said phase-shifter and said phase inverter to the input circuit of said receiver, means for orienting the plane of said antennas with respect to the plane of the arriving wave whereby the signals from said antennas cancel in said receiver input circuit, and means for indicating the resultant horizontal angular displacement between the plane of said antennas and the plane of direction of the arriving wave, whereby the vertical angle of incidence of the arriving wave may be determined from the formula $$\cos B = \frac{L \sec D}{a}$$

where,

L is a constant dependent upon the length and characteristics of said transmission line phase shifter, $a$ is a fixed spacing between said antennas, D is the horizontal angular displacement between the plane of said antennas and the plane of direction of said arriving wave, and B is the vertical angle of incidence of said arriving wave.

3. Apparatus for measuring the vertical angle of incidence of an arriving wave comprising a radio direction-finder for determining the azimuth of the directional plane of an arriving wave, a pair of vertical receiving antennas having a fixed spacing therebetween, a radio receiver having an input circuit, means for applying the output signals from one of said antennas directly to said receiver input circuit, a nonresonant transmission line phase-shifter, a phase inverter, means for applying the output signal from the other of said antennas through said phase-shifter and said phase inverter to the input circuit of said receiver, means for orienting the plane of said antennas with respect to the plane of the arriving wave whereby the signals from said antenna pairs cancel in said receiver input circuit, and means for indicating the resultant horizontal angular displacement between the plane of said antennas and the plane of direction of the arriving wave, whereby the vertical angle of incidence of the arriving wave may be determined from the formula $$\cos B = \frac{L \sec D}{a}$$

where,

L is a constant dependent upon the length and characteristics of said transmission line phase shifter,
$a$ is a fixed spacing between said antennas,
D is the horizontal angular displacement between the plane of said antennas and the plane of direction of said arriving wave, and
B is the vertical angle of incidence of said arriving wave.

4. In apparatus for measuring the vertical angle of incidence of an arriving wave, the combination comprising a rotatable Adcock array having a pair of vertical dipoles mounted at opposite ends of a horizontal supporting arm, a rotatable incidence angle-determining array having a pair of vertical dipoles mounted at opposite ends of a horizontal supporting arm, a first shaft vertically disposed, the upper end of said shaft being affixed to the midpoint of said Adcock arm, a second shaft concentric with said first shaft, the upper end of said second shaft being affixed to the midpoint of said incidence angle-determining arm, and means for indicating the angular position of said first shaft relative to said second shaft, whereby the vertical angle of incidence of the arriving wave may be determined from the formula $$\cos B = \frac{L \sec D}{a}$$

where,

L is a constant dependent upon the length and characteristics of said transmission line phase shifter,
$a$ is a fixed spacing between said antennas,
D is the horizontal angular displacement between the plane of said antennas and the plane of direction of said arriving wave, and
B is the vertical angle of incidence of said arriving wave.

JOHN M. FAIRALL.

REFERENCES CITED

The following references are of record in the file of this patent:

UNITED STATES PATENTS

| Number | Name | Date |
| --- | --- | --- |
| 1,722,051 | Kolster | July 23, 1929 |
| 1,952,326 | Ludenia | Mar. 27, 1934 |
| 1,979,297 | Taylor | Nov. 6, 1934 |
| 2,166,991 | Guanella | July 25, 1939 |
| 2,312,799 | Carter | Mar. 2, 1943 |
| 2,350,080 | Sproule | May 20, 1944 |
| 2,365,118 | Strafford | Dec. 12, 1944 |
| 2,366,632 | Lindenblad | Jan. 2, 1945 |
| 2,404,012 | Worrall | July 16, 1946 |

FOREIGN PATENTS

| Number | Country | Date |
| --- | --- | --- |
| 305,632 | Great Britain | Nov. 14, 1929 |